United States Patent

[11] 3,588,448

| [72] | Inventor | Garo M. Ziver<br>Greencastle, Pa. |
|---|---|---|
| [21] | Appl. No. | 809,341 |
| [22] | Filed | Mar. 21, 1969 |
| [45] | Patented | June 28, 1971 |
| [73] | Assignee | Corning Glass Works<br>Corning, N.Y. |

[54] TEMPERATURE CONTROL SYSTEM FOR GLASS-CERAMIC COOK-TOP
13 Claims, 8 Drawing Figs.

| [52] | U.S. Cl. | 219/511 |
|---|---|---|
| [51] | Int. Cl. | H05b 1/02 |
| [50] | Field of Search | 219/505,<br>511, 494, 501 |

[56] References Cited
UNITED STATES PATENTS

| 3,396,265 | 8/1968 | Jacobson | 219/511 |
| 3,445,631 | 5/1969 | Fickweiler | 219/494 |
| 3,448,245 | 6/1969 | Brouneus et al. | 219/494 |

*Primary Examiner*—Harold Broome
*Assistant Examiner*—F. E. Bell
*Attorney*—Sughrue, Rothwell, Mion, Zinn and Macpeak ABSTRACT: A temperature control circuit for use with a glass-ceramic cook-top. The control circuit controls the rate at which heat is generated by the cook-top and also prevents the temperature of the cook-top from exceeding a maximum temperature which could cause permanent damage to the cook-top; i.e., the circuit provides both input rate control and over-temperature control. The amount of heat delivered to the cook-top is controlled by a thermal relay which is operated by elements sensitive to the temperature of the cook-top. The control circuit consists basically of an electrical heating element, a temperature sensing element which is integrated with the heating element, a thermal relay, a solid-state switching network including at least one silicon-controlled rectifier, and a regulated voltage supply network including a Zener diode.

PATENTED JUN 28 1971

INVENTOR
GARO M. ZIVER

BY
Sughrue, Rothwell, Mion, Zinn & Macpeak
ATTORNEYS 3,588,448

TEMPERATURE CONTROL SYSTEM FOR GLASS-CERAMIC COOK-TOP

BACKGROUND OF THE INVENTION

1. Field of the Invention

The invention relates to the field of temperature control and more particularly to electrical circuits for controlling and maintaining the temperature of a glass-ceramic cook-top at a preselected temperature regardless of the container or object placed upon the cook-top.

2. Description of the Prior Art

The key factor that imposes a limit on the operating temperature of a glass-ceramic cook-top is the temperature-induced deterioration of the cook-top. For example, for a chemically strengthened (potassium-ion exchanged) Pyroceram brand glass-ceramic cook-top, this limiting temperature is about 600° C. Secondary temperature limiting factors are the thermal limitations of the materials that constitute the heater element assembly, including the temperature sensor of the control system. This temperature sensor (a length of copper tubing filled with silicon oil) is able to control relatively high levels of heat flux without exceeding its operational temperature limit of 500° F. Only because of its small size, its central location within the "burner" area, and the optimized thermal coupling provided between it and flat-bottom vessels.

This type of control system and sensor, however, severely limits the use of vessels without flat bottoms with prior art glass-ceramic cook-tops which depend on good thermal communication between the cook-top and the vessel to a degree not obtainable with nonflat vessels. The low temperature control systems used with prior art cook-tops required a mated vessel and cook-top, i.e., the shape of the cook-top had to conform to the shape of the bottom of the vessel. Consequently, the need for a nonmated system is apparent; however, a nonmated system has to operate at higher cook-top temperatures to produce heating of the vessel's contents which is equivalent to that obtained by mated systems.

The strength release point of potassium-ion exchanged Pyroceram brand glass-ceramic is adequately high to allow its use as a cook-top in a nonmated system, provided that the operating temperature of the cook-top is never allowed to exceed the 600° C. limit under all possible conditions of use. However, in order to effectively prevent localized overheating of the cook-top, the temperature sensor for a system of this type would have to be relatively insensitive to vessel size and vessel orientation relative to the "burner" area. It would also have to be operational at temperatures up to 700° C. to provide a safety factor above the 600° C. limit of the cook-top.

SUMMARY OF THE INVENTION

The invention may thus be summarized as a control circuit for providing the required heating rate and temperature control function for a high temperature glass-ceramic cook-top so that nonflat vessels may be efficiently and safely used on a flat cook-top. The invention permits the use of higher temperatures in the cook-top by employing a sensor which is physically distributed in close proximity to the heating element over the entire cook-top. These higher temperatures could not be achieved in prior art control systems since the sensor had a relatively low temperature limit (approximately 500° F.), and relatively high levels of heat flux could be controlled only because the sensor was small and located within the "burner" area where the thermal coupling provided between it and the flat-bottom vessels was optimized.

In addition, the invention provides a temperature control circuit which regulates the heat delivered to the electrical heating element of the cook-top by employing both input rate control and over-temperature control. Input rate control is a method of controlling the temperature of a cook-top by maintaining the rate at which heat is generated in the cook-top. However, since the temperature of the cook-top will vary with the communication of heat to the vessel even with a constant input of heat, this method is only accurate when the thermal communication between the vessel and cook-top is relatively constant. Over-temperature control merely limits the maximum available temperature and thus gives no temperature control at temperatures below this maximum. This control system differs from prior art control systems which employed either input rate control or over-temperature control, but not both.

Accordingly, the primary object of the invention is to provide a nonmated glass-ceramic cook-top system which operates at high cook-top temperatures, thus achieving equivalent operation to a low temperature mated vessel-cook-top system.

Another object of the invention is to provide a temperature control circuit for regulating the current delivered to an electrical heating element of the cook-top, which circuit simultaneously employs both input rate control and over-temperature control.

Another object is to provide a temperature sensor which is distributed in close proximity to the heating element over the entire cook-top, thus eliminating localized heating and insuring that no part of the glass-ceramic cook-top will exceed its maximum temperature limitation regardless of the shape of the container or object placed upon the cook-top.

DESCRIPTION OF THE PREFERRED EMBODIMENTS

Figure 1:
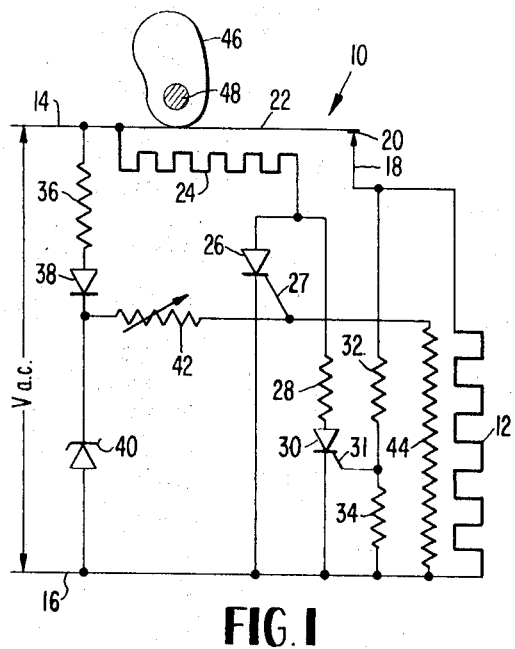
FIG. 1 is a schematic diagram of one embodiment of the invention including both input rate control and over-temperature control.

The circuit of FIG. 1 provides both input rate control and over-temperature control and represents one embodiment of this invention. A thermal relay 10 and a cook-top heating element 12 are connected in series across a pair of power lines 14 and 16 which are adapted to be connected to a source of AC power, such as 60 Hz, 230 V, for example.

Thermal relay 10 has a fixed contact 18 and also a movable contact 20 which is mounted on a bimetallic arm 22. A relay heater coil 24 is physically close to arm 22 and has one end electrically connected to power line 14. The other end of coil 24 is connected through an SCR 26 to the other power line 16 and also through a resistor 28 and another SCR 30 to the line 16.

Connected across heating element 12 is a voltage divider consisting of resistors 32 and 34. The gate electrode 31 of SCR 30 is connected to the juncture of these two resistors.

Connected in series across power lines 14 and 16 are a resistor 36, a diode 38, and a zener diode 40. A resistor 42 and a temperature sensor element 44 are connected in series between power line 16 and the juncture of diode 38 and diode 40. The gate electrode 27 of SCR 26 is connected to the juncture of resistor 42 and temperature sensor element 44.

Figure 7:
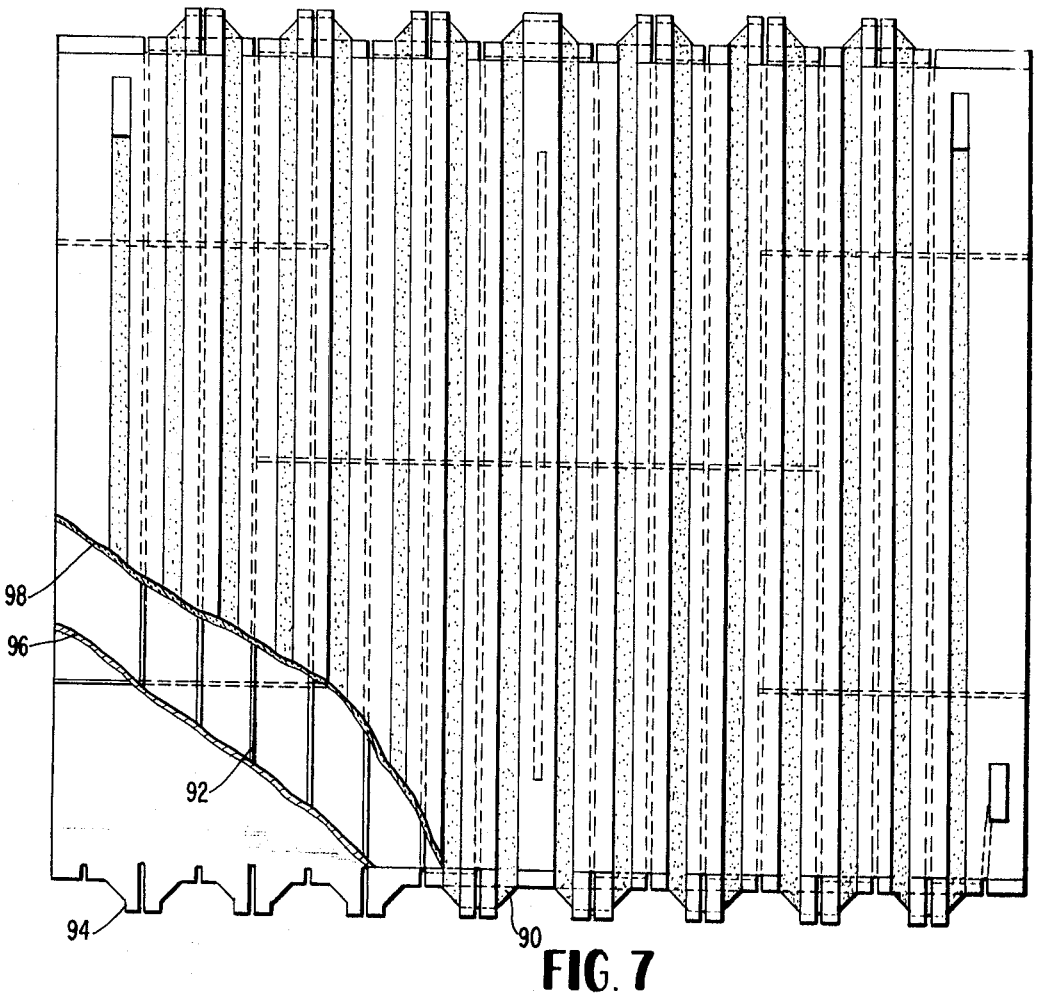
FIG. 7 is a diagram of the cook-top showing the relative locations of the heating and temperature sensing elements.

The temperature sensor 44 is a resistor whose resistance is directly proportional to its temperature. Sensor 44 is physically close to, and in thermal communication with, heating element 12, as illustrated in FIG. 7.

An adjustable mechanical biasing means, such as a cam 46 mounted on a shaft 48, applies a mechanical bias to bimetallic arm 22 to determine the rate at which heat is generated at heating element 12.

The operation of FIG. 1 is as follows. When the contacts 18, 20 of thermal relay 10 are closed, heating element 12 in a glass-ceramic cook-top is energized by the AC line voltage Vac. Over-temperature control is provided by temperature sensor element 44 which is placed in close proximity to, and in thermal communication with, the heating element 12. The resistance of sensor element 44 is directly proportional to its temperature. Voltage across the sensor element is provided by a voltage supply network consisting of Zener diode 40, diode 38, and resistor 36. The voltage developed across the sensor 44 is applied to the gate electrode 27 of SCR 26. The resistor 42 is a trimming resistor which is preset during manufacture of the circuit to adjust the firing point of SCR 26 to correspond to the desired sensor temperature which provides the correct over-temperature control.

When the maximum tolerable temperature is reached by heating element 12, the resistance of sensor 44 has increased to such a value that the voltage across it is sufficient to gate SCR 26 into conduction. With SCR 26 conducting, current will flow through the thermal relay heater coil 24. When the temperature of the heater coil 24 has risen to some preset value, bimetallic arm 22 will flex upwardly, thereby opening the contacts 18, 20 of the thermal relay 10. Consequently, no more current will flow through the heating element 12 until the contacts 18, 20 have closed. The temperature that the thermal relay heater 24 must reach in order to open thermal relay 10 is conventionally determined, for example, by the mechanical bias provided by a cam 46 in engagement with the bimetal. Cam 46 is fixed to a rotatable shaft 48 which may be rotated by a person using the cook-top to vary the mechanical bias, and thereby the temperature of the cook-top.

Since the contacts 18, 20 are now open, no current flows through heating element 12 and sensor 44 will begin to cool. After some time interval sensor 44 will have cooled to such an extent that its resistance has lowered to a level that is insufficient to generate a voltage at gate 27 sufficiently high to fire SCR 26. Thus, SCR 26 will cease to conduct and no current will flow through heater coil 24. The coil will then start to cool and eventually the bimetal arm 22 will flex downward and close the contacts 18, 20, and current will again flow through heating element 12.

Input rate control is provided by SCR 30 and the voltage divider consisting of resistors 32 and 34 whose junction is connected to the gate electrode 31 of SCR 30. During the upswing of each positive half-cycle of the input AC voltage Vac, this voltage divider will apply to the gate electrode 31 a voltage sufficient to fire or render conducting SCR 30. The magnitude of the voltage applied to gate electrode 31, and thereby the time in the positive half-cycle when SCR 30 begins to conduct, is determined by the relative values of resistors 32 and 34. With SCR 30 in conduction, current will again be diverted from heating element 12 to the thermal relay heater 24 to cause a certain quantity of heat to be generated by heater coil 24 during the next portion of the positive half-cycle of Vac when SCR 30 is conducting. In a similar fashion, a certain quantity of heat will be generated by thermal relay heater coil 24 during each cycle of the Vac waveform. During each cycle, the current through heater coil 24 will generate heat which raises the temperature of the thermal relay 10, and after a number of cycles the accumulated heat will be sufficient to raise the temperature to a level which is sufficient to cause the bimetal 22 of the thermal relay 10 to open contacts 18, 20. The amount of heat required to open the thermal relay 10 is again conventionally determined by the amount of mechanical bias applied to the bimetal 22 by cam 46 fixed to rotatable shaft 48. The mechanical bias can be varied by rotating the shaft, and thus the temperature of the heating element 12 can be controlled at any temperature between room temperature and the maximum temperature which is determined by the over-temperature control.

From the above discussion it is apparent that the input rate control is operated by the voltage divider comprising resistors 32 and 34, the SCR 30, the heater coil 24 and the mechanical bias upon bimetal 22. The rate is controlled by the mechanical bias on the bimetal 10 and the temperature of heater coil 24. However, the temperature of the heater coil 24 is not the same as that of heating element 12 since the temperature of heater 12 will vary with its thermal communication with the vessel placed upon it. Therefore, the input rate control will not limit the temperature of the cook-top. This is the function of the over-temperature control and, since there is some limiting temperature for the material of the cook-top (approximately 600° C. for potassium-ion exchanged Pyroceram brand glass-ceramic), it is apparent the over-temperature control must predominate over the input rate control.

Interaction between the rate control and over-temperature control is achieved by resistor 28 which allows the over-temperature control to predominate. This predominance results since, when SCR 26 is conducting, resistor 28 and SCR 30 are effectively short-circuited by the lower resistance path through SCR 26, and SCR 30 cannot become conducting.

Figure 2:
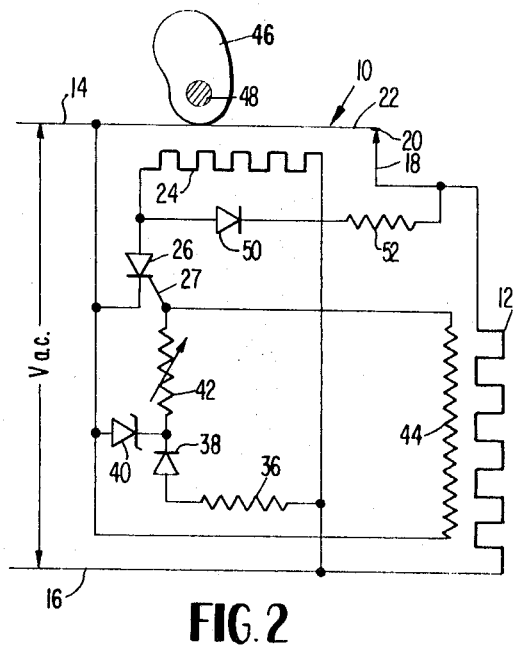
FIG. 2 is a schematic diagram showing a modification of FIG. 1.

FIG. 2 illustrates a modification of the circuit shown in FIG. 1 and employs only a single SCR. The circuit connections are similar to that shown in FIG. 1. The only change is the replacement of SCR 30 and resistor 28 with diode 50 and resistor 52, and the elimination of the voltage divider consisting of resistors 32 and 34. The diode 50 and the resistor 52 are connected in series and couple the juncture of SCR 26 and heater coil 24 to the juncture of contact 18 and heating element 12. The diode 50 and resistor 52 now perform the steering function provided by SCR 30 in FIG. 1.

The circuit of FIG. 2 operates functionally the same as the circuit of FIG. 1. However, it has the advantages of simplicity and lower cost which are attained by using a single SCR in place of the two used in FIG. 1. Diode 50 and resistor 52 provide the function of SCR 30 and the voltage divider network consisting of resistors 32 and 34 in FIG. 1. The only difference is that current is now delivered to the thermal relay heater 24 at all times during the positive half-cycles of the applied AC voltage Vac since there is no gating element to operate. No current is delivered to the heater 24 during the negative cycle. Resistor 52 also performs the same function as resistor 28 in FIG. 1 in allowing the over-temperature control to predominate, since, when the SCR 26 is gated into conduction by the increase of resistance of temperature sensor 44, it will short circuit resistor 52 and allow more current to flow through thermal relay heater 24.

Figure 3:
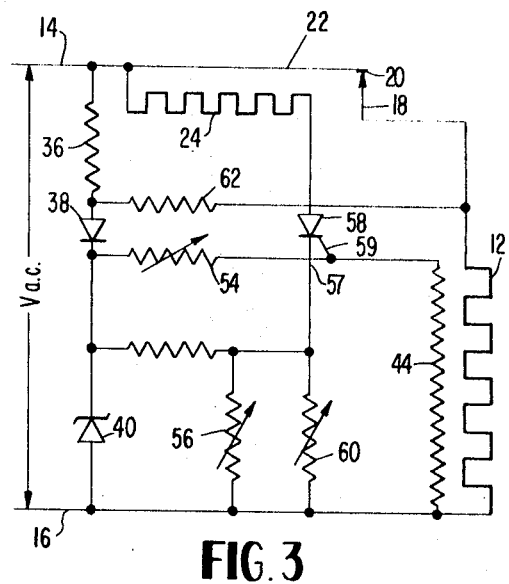
FIG. 3 is a schematic diagram of a conventional temperature control circuit with the added heat reduction feature.

FIG. 3 is a schematic of a conventional over-temperature control circuit with an added heat reduction feature and is appropriate for an explanation of this feature. A voltage supply network of Zener diode 40, diode 38, and resistor 36 function in the same manner as explained above with respect to FIG. 1. Resistors 54 and 56 are trimming resistors to set the minimum and maximum ranges of temperature operation, respectively, since their values will determine the voltage necessary to gate an SCR 58 into conduction. This occurs since the value of the resistor 54 controls the voltage at the gate 59 of SCR 58, and the value of the resistor 56 controls the voltage at the cathode 57 of SCR 58. Resistor 60 is a variable resistor to give temperature control within these temperature extremes. The bimetal 22 is not provided with mechanical bias as before but is controlled entirely by SCR 58 and sensor 44. Thus, this circuit does not provide input rate control. Whenever temperature sensor 44 gates SCR 58 into conduction, current flows through the heater coil 24, and when sufficient heat is generated, bimetal 22 flexes upward and opens contacts 18 and 20. Without the heat reduction feature provided by a resistor 62, the same amount of heat would be generated in the heater coil 24 during each cycle of Vac until sensor 44 has cooled sufficiently to turn off SCR 58. This continual generation of large amounts of heat in heater coil 24 might be harmful to the heater, and would also produce a time lag in the operation of the circuit since the contacts 18 and 20 are not closed until heater coil 24 has sufficiently cooled to flex the bimetal 22 even though sensor 44 has gated off SCR 58. This response lag plus the reaction time of the thermal relay determine the temperature excursions of the cycle width with which the system will maintain a given cook-top temperature. The cycle width is the temperature variation that is required in order to maintain a desired average temperature.

Figure 4A:
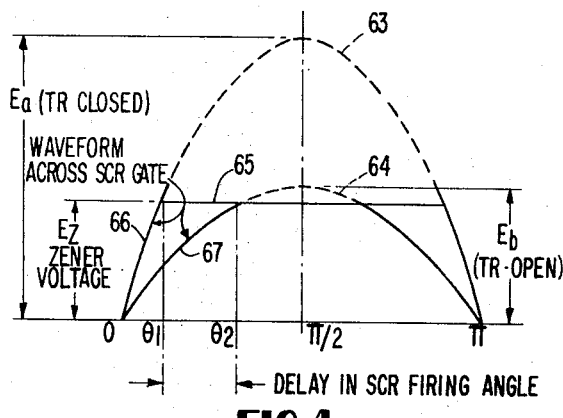
FIG. 4a illustrates voltage waveforms which are used in the explanation of the heat reduction feature of the invention.

In order to reduce, or otherwise adjust, this cycle width, resistor 62 is included in the circuit. It is coupled from the juncture between resistor 36 and diode 38 to the juncture between contact 18 and heating element 12. Its basic purpose is to increase the rise time of the AC waveform applied across the Zener diode 40. Since the Zener diode 40 supplies the voltage required to operate the gate 59 of the SCR 58, an increase in the rise time of the voltage across the Zener diode 40 will result in the SCR 58 conducting for a shorter time interval each AC cycle since its gate voltage will not be reached until later in the AC cycle. This will result in a reduction of current delivered to heater coil 24 and therefore, a reduction in the heat generated by heater coil 24. The values of resistor 36 and resistor 62 are adjusted so that, when in parallel with the closed thermal relay contacts 18 and 20, and AC waveform with peak voltage of about two to three times that of the Zener voltage is applied across the Zener diode. This waveform is illustrated in FIG. 4a. It is labeled 63 and has a magnitude of E$a$. When the contacts 18 and 20 are opened, resistor 62 will conduct a current through the heater 12. This conduction will result in a reduction in the voltage applied across the Zener diode 40. This reduced voltage waveform is shown in FIG. 4a. It is labeled 64 and has a magnitude of E$b$. Thus, the voltage waveform 63 is reduced from a peak value of E$a$ when the thermal relay is closed to that of E$b$ when the thermal relay is opened. Hence, the rise time of the voltage waveform across Zener diode 40 is slower when contacts 18 and 20 are opened, and this reduction in rise time will cause a delay in the firing of SCR 58. This reduction in rise time is illustrated by the rise time waveform segments 66 and 67 in FIG. 4a. The delay in firing is illustrated by the difference between $\theta 2$ and $\theta 1$ which represent the times at which the voltage waveform applied across the Zener diode 40 has reached the Zener voltage E$z$. This time will represent the delay in the firing of SCR 58 since the voltage developed by the Zener diode operates the gate 59 of the SCR 58. Thus, the circuit of FIG. 3 has a controlled degree of anticipation to counter the thermal response lag, since less heat is generated in heater coil 24 when the contacts 18 and 20 are opened than when they are closed. Thus, less time is required for the contacts 18 and 20 to close with this heat reduction feature than if current were delivered to the heater coil 24 for a longer time interval during each AC cycle.

Figure 4B:
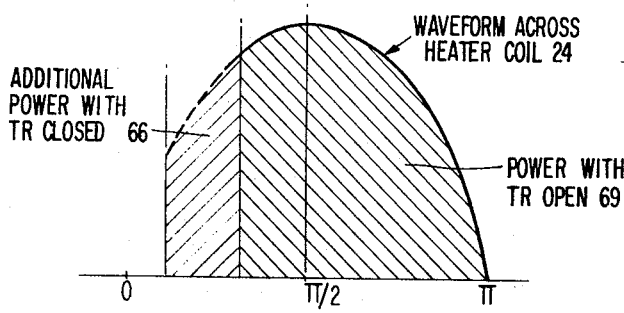
FIG. 4b illustrates power waveforms which graphically show the heat reduction feature.

FIG. 4b illustrates this power reduction by showing the power waveforms developed across the heater coil 24. Area 68 represents the additional power across the heater coil 24 when the contacts 18 and 20 are closed, and area 69 represents the reduced power delivered to the heater coil 24 when the contacts 18 and 20 are opened.

Figure 5:
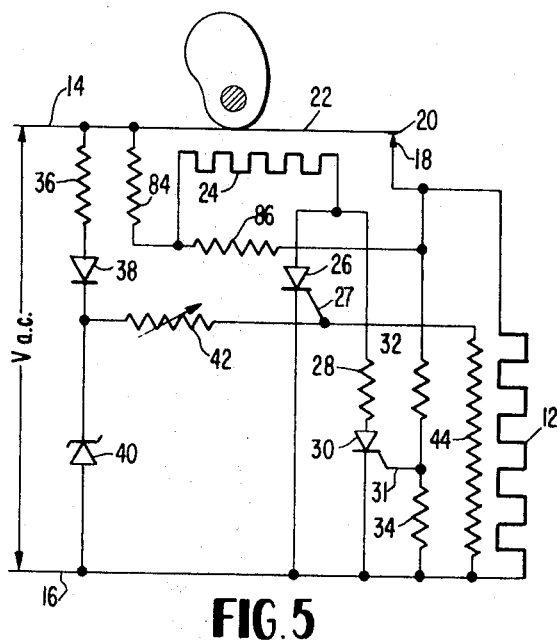
FIG. 5 is a schematic diagram of the modified embodiment of the invention as shown in FIG. 1 with an added heat reduction feature.

Another means for reducing the thermal lag of the system is illustrated in FIG. 5. The circuit shown in FIG. 5 is identical to that shown in FIG. 1 except that resistors 84 and 86 have been added. Here again, the idea is to limit the heat generated in heater coil 24 when the contacts 18 and 20 are opened. When the contacts 18 and 20 are opened the resistors 84 and 86 are in parallel with these contacts. When the contacts 18 and 20 are opened the resistors 84 and 86 act as a voltage divider delivering a voltage to the heater coil 24. Their values are chosen such that they impress a higher voltage across the heater coil 24 when the contacts 18 and 22 are opened than when closed. The levels of heat generated in heater coil 24 can be tailored by the appropriate selection of the resistors 84 and 86.

Figure 6:
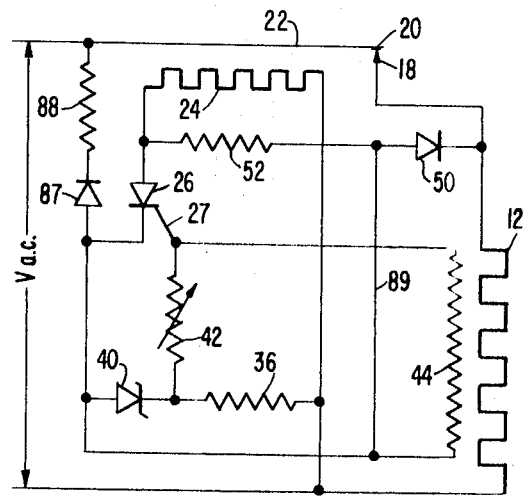
FIG. 6 is a schematic diagram of the embodiment of FIG. 2 with an added power limiting feature.

FIG. 6 shows the embodiment of FIG. 2 with an added power limiting feature. This power limiting feature achieves the generation of variable heat by heater coil 24 by varying the current supplied thereto so that the heater coil current is always greater when contacts 18 and 20 are closed then when they are opened. This result is accomplished by the addition of a diode 87, a resistor 88, and a conductor 89. When the contacts 18 and 20 are closed, diode 50 shunts resistor 88 and diode 87; and with SCR 26 in a conducting state maximum voltage appears across heater coil 24. When the temperature of the heating element exceeds its maximum, SCR will conduct causing the contacts 18 and 20 to open. Resistor 88, which is lower in value than resistor 52, is placed in series with heater coil 23, diode 87 and SCR 26, which is conducting, and thus the voltage across heater element 24 is reduced by an amount proportional to the relative resistance of resistor 88. Hence, less current is supplied to heater coil 24, and subsequently less heat is generated in coil 24 when the contacts 18 and 20 are opened than when they are closed. This occurs since the resistor 88 increases the driving resistance of the line voltage whenever the contacts 18, 20 are open. This reduction in heat will allow the contacts 18 and 20 to close in a shorter time after the SCR 26 is gated off since it will not take so long for heater coil 24 to cool sufficiently so that the bimetal is flexed.

FIG. 7 shows the internal structure of the cook-top and the relative positions of the heating elements and the sensor element. A heating element ribbon 90 is wrapped upon a mica substrate 94. The temperature sensor wire 92 is a length of pure or alloy nickel wire compoundly wound with the heating element ribbon 90. The sensor element is thus in close proximity to the heating element over the entire cook-top. The sensor and element windings may be separated from the substrate by a layer of thermal insulation 96. A thin sheet of high temperature material 98, such as 0.010 inch fibrefrax paper, may be installed over the sensor windings but under the element ribbons to provide additional electrical isolation. Alternatively, the sensor may be incorporated in the cook-top by cementing the sensor wire, arranged in serpentine configuration, directly to the under surface of the cook-top under a layer of fibrefrax paper soaked in an electrically insulating refractory cement, such as carborundum QF 180 cement or its equivalent.

While the invention has been particularly shown and described with reference to preferred embodiments thereof, it will be understood by those skilled in the art that various changes in form and details may be made therein without departing from the spirit and scope of the invention.

I claim:

1. In a temperature control circuit for regulating the heat generated in an electrical heating element adapted to be energized from a source of alternating current, the improvement for simultaneously providing over-temperature control and input rate control of said heating element comprising:
   a. a single heat-responsive switch normally connecting said electrical heating element in series with said source of alternating current;
   b. an electrical heater responsive to current flowing therethrough for supplying heat to said switch;
   c. temperature sensor means responsive to a predetermined temperature of said heating element to produce an over-temperature signal;
   d. first normally nonconducting circuit means connected to said heater and responsive to said over-temperature signal to become conducting for delivering current from said source to said heater, thereby heating said single heat responsive switch to operate said switch to disconnect said heating element from said source;
   e. second circuit means also connected to said heater for delivering current to said heater only when said heating element is connected to said source; and
   whereby said switch is operated to disconnect said heating element from said source whenever said predetermined temperature of said heating element is exceeded and whenever heat is generated by said heater at a rate greater than a predetermined rate.

2. The temperature control circuit of claim 1 further comprising means for reducing the current delivered to said heater whenever no current is delivered to said heating element for preventing an unnecessary accumulation of heat in said heater.

3. The temperature control circuit of claim 1 wherein said first circuit means comprises a solid state switching circuit and a voltage supply network for operating said solid state switching circuit.

4. The temperature control circuit of claim 1 wherein said switch comprises a bimetal element and two contacts and said bimetal element operates said contacts to connect and disconnect said source to said heating element.

5. The temperature control circuit of claim 3 wherein said first circuit means comprises a normally nonconducting first controlled rectifier with a gate electrode and coupling said heater to said source, and said gate electrode is responsive to said over-temperature signal to render said controlled rectifier conducting.

6. The temperature control circuit of claim 5 wherein said second circuit means comprises a diode and a resistor coupled between said heater and said heating element to provide a steering circuit delivering current coincidentally to said heater and said heating element during one polarity of half cycles of said source but preventing current flow in said heater during the other polarity of half cycles of said source.

7. The temperature control circuit of claim 1 wherein said temperature sensor means comprises a winding which is integral with said electrical heating element, said winding being distributed over the entire area of said heating element.

8. The temperature control circuit of claim 7 wherein said winding is wound upon a mica base in close proximity and parallel to said electrical heating element such that said winding is electrically isolated from the said heating element but is distributed over the entire heating surface thereof.

9. The temperature control circuit of claim 2 wherein said means for reducing the current delivered to said heater comprises a resistor and diode connected in series with said heater and in parallel with said switch for increasing the driving resistance of said source whenever said switch disconnects said source from said heating element.

10 The temperature control circuit of claim 2 wherein said means for reducing the current delivered to said heater comprises a resistance in parallel with said heater and coupled between said source and said heating element for reducing the portion of the cycle of the alternating current that said first circuit means delivers to said heater.

11. A temperature control circuit for regulating the heat generated in an electrical heating element adapted to be energized from a source of alternating current, including a single heat-responsive switch normally connecting said electrical heating element in series with said source of alternating current, and an electrical heater responsive to current flowing therethrough for supplying heat to said switch means, the improvement for simultaneously providing over-temperature control of both said heating element and said heater, comprising:

a. temperature sensor means responsive to a predetermined temperature of said heating element to produce an over temperature signal;

b. a normally nonconducting controlled rectifier coupled between said heater and said source and having a gate electrode circuit responsive to said over-temperature signal to render said controlled rectifier conducting to cause current to flow to said heater, thereby heating said heat responsive switch to cause it to disconnect said heating element from said source, and c. means connected to said gate electrode circuit for modifying said over-temperature signal whenever said source is disconnected from said heating element, thereby reducing the current flowing through said heater.

12. The temperature control circuit of claim 5 wherein said second circuit means comprises a resistor and a second controlled rectifier connected between said heater and said source, said controlled rectifier having a gate electrode controlled by the voltage of said source for controlling the conduction of said second controlled rectifier to regulate the amount of current delivered to said heater when said source is connected to said heating element.

13. The improvement of claim 11 wherein said means connected to said gate electrode circuit for modifying said over-temperature signal comprises a resistor connected to shunt a portion of said over-temperature signal away from the gate electrode of said controlled rectifier.